United States Patent [19]

Jang

[11] Patent Number: 4,930,821
[45] Date of Patent: Jun. 5, 1990

[54] COVER-LOCKING DEVICE FOR A VIDEO TAPE CASSETTE

[75] Inventor: Hyo Keun Jang, Chungchongnam-do, Rep. of Korea

[73] Assignee: SKC Limited, Rep. of Korea

[21] Appl. No.: 298,343

[22] Filed: Jan. 17, 1989

[30] Foreign Application Priority Data

Aug. 18, 1988 [KR] Rep. of Korea .................. 88-13472

[51] Int. Cl.$^5$ .............................................. E05C 3/14
[52] U.S. Cl. ........................... 292/228; 292/DIG. 38; 242/197; 242/200; 360/132
[58] Field of Search .............. 292/228, DIG. 38, 219, 292/254; 360/132; 242/197, 198, 200

[56] References Cited

U.S. PATENT DOCUMENTS

| | | | |
|---|---|---|---|
| 3,709,538 | 1/1973 | Seitz et al. | 292/DIG. 38 |
| 3,797,870 | 3/1974 | Beckman | 292/D38 |
| 3,841,674 | 10/1974 | Bisbing et al. | 292/175 |
| 4,227,622 | 10/1980 | Okamura et al. | 242/197 |
| 4,436,201 | 3/1984 | Inaba | 292/D38 |
| 4,466,583 | 8/1984 | Giannis et al. | 242/198 |
| 4,674,303 | 6/1987 | Salcone, II | 292/D38 |
| 4,712,150 | 12/1987 | Pertzsch et al. | 360/132 |
| 4,744,530 | 5/1988 | Cybulski et al. | 360/132 |
| 4,763,218 | 8/1988 | Westfall et al. | 242/199 |
| 4,780,783 | 10/1988 | Osawa et al. | 360/132 |
| 4,824,044 | 4/1989 | Oogi | 242/198 |

FOREIGN PATENT DOCUMENTS 54-181634 8/1981 Japan.

Primary Examiner—Alexander Grosz
Assistant Examiner—Michael J. Milano
Attorney, Agent, or Firm—Lowe, Price, LeBlanc, Becker & Shur

[57] ABSTRACT

A cover-locking device for a video tape cassette which includes a cover-locking pin having a lock-releasing protrusion and an engaging protrusion. The cover-locking pin is pivotably supported in a lower-half of the cassette. The cover-locking device also includes a spring member which is integrally formed on and protrudes upwardly and outwardly from the upper surface of the cover-locking pin between two supporting shafts so as to be urged upon the side inner surface of the chamber formed in the tape cassette when supported in the lower-half of the cassette.

6 Claims, 4 Drawing Sheets

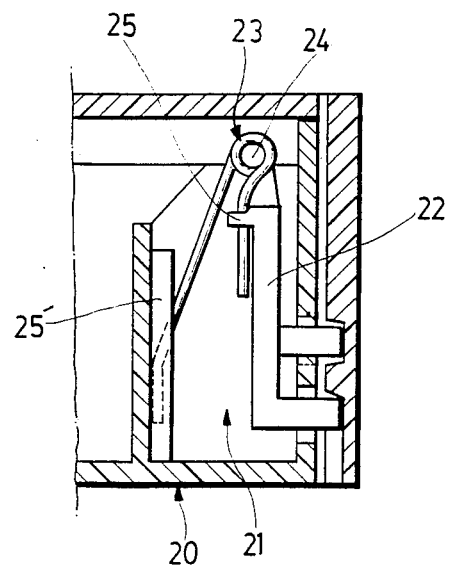

COVER-LOCKING DEVICE FOR A VIDEO TAPE CASSETTE

BACKGROUND OF THE INVENTION

The present invention relates to a cover-locking device for a video tape cassette. In particular, the present invention relates to a cover-locking device for a video tape cassette wherein a spring member is internally formed on the upper surface of a cover-locking pin adapted to open and close the cover of the tape cassette so that the cover can be opened and closed by the spring force of said spring member, without the use of any conventional coil spring.

Conventionally, each video tape cassettes has, at the front thereof, a cover which is adapted to protect the tape when the tape cassette is not loaded on a deck.

When the tape cassette is loaded on the deck to be operated in a front loading mode, the locking of the cover is released, so that the cover is automatically opened, thereby enabling the tape to be in contact with a head of the deck.

Referring to FIG. 5, a conventional cover-locking device is shown. As shown in the drawing, a coil spring 23 is assembled on a cover-locking pin 22 disposed in a chamber 21 formed at the front end portion of a lower-half 20 of a tape cassette at the right side thereof. In order to prevent the separation of the spring from the cover-locking pin, the cover-locking pin 23 has a shaft 24 supporting said spring and a spring protection rib 25. As a result, the overall construction of the cover-locking pin becomes complex. Furthermore, the coil spring itself is a separate steel wire element which has to be separately manufactured. In particular, even when the assembly of the tape cassette is carried out by a robot on an automatic assembling line, the coil spring should be manually assembled. Consequently, there are problems of the inconvenience in assembling the tape cassette and the increase of the manufacturing cost.

SUMMARY OF THE INVENTION

Therefore, an object of the present invention is to eliminate the disadvantages encountered in the above-mentioned prior art and to provide a cover-locking device for a video tape cassette which can eliminate the use of the coil spring by providing a spring member integrally formed on the upper portion of the cover-locking pin so that the automatic assembly of the cassette can be accomplished and the manufacturing cost can be reduced.

In accordance with the present invention, this object is accomplished by providing a cover-locking device for a video tape cassette including a lower-half, an upper-half and a chamber formed at a front portion of said lower-half at one side thereof, said cover-locking device comprising a cover-locking pin having lock-releasing and engaging protrusions extending from one side thereof, adapted to outwardly protrude through respective through-holes formed in said one side of said lower-half, and a pair of shafts laterally protruding from opposite upper sides of said cover-locking pin for pivotably supporting said cover-locking pin on support members disposed in said chamber said cover-locking device further comprising a spring member integrally formed on an upper surface of said cover locking pin, said spring member extending outwardly at an acute angle with respect to a direction normal to said upper surface in the direction at which said releasing and engaging protrusions protrude so as to be urged upon a side inner surface of said chamber when said cover-locking pin is supported on said support members.

BRIEF DESCRIPTION OF THE DRAWINGS

The present invention will be described in greater detail hereinafter with reference to the accompanying drawings wherein;

FIGS. 4A and 4B are partial sectional views showing the operating conditions of the cover-locking device of the present invention, wherein FIG. 4A shows the condition when an engaging protrusion of a cover-locking pin is engaged in an engaging groove of the cover, while FIG. 4B shows the condition when said engaging protrusion is disengaged from said engaging groove; and FIG. 5 is a partial sectional view of a cover-locking device of a prior art.

DETAILED DESCRIPTION OF THE PREFERRED EMBODIMENS

Figure 1:
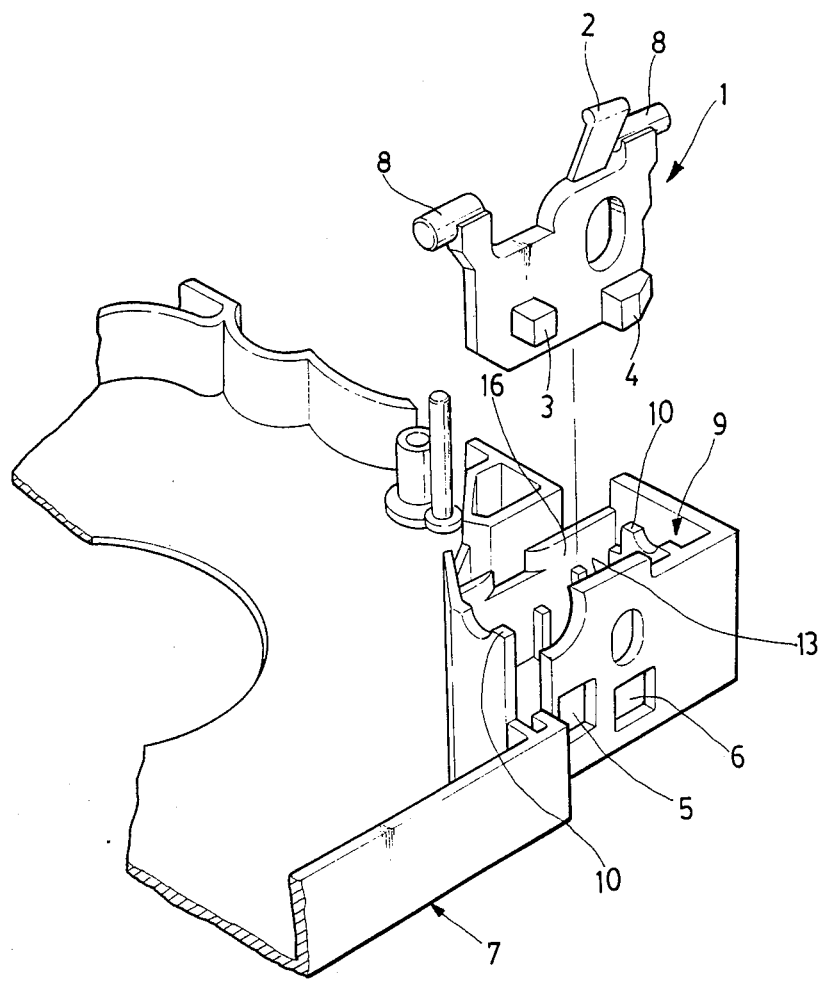
FIG. 1 is an exploded perspective view of a cover-locking device for a video tape cassette in accordance with the present invention.
Figure 2:
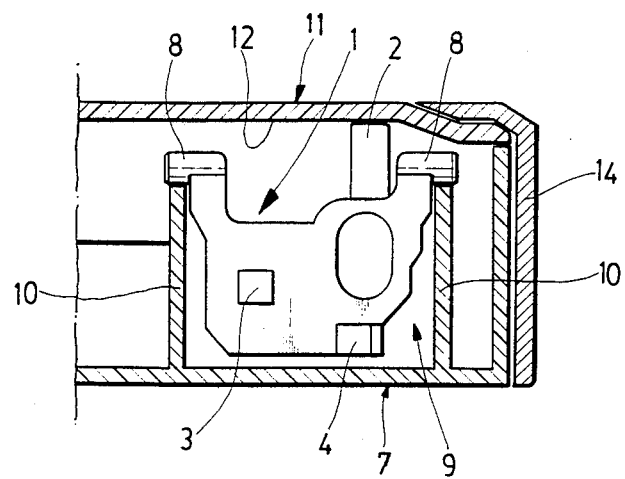
FIG. 2 is a partially cut-away front view of the cover-locking device of the present invention.

Referring to FIG. 1, there is shown a video tape cassette to which a cover-locking device according to the present invention is applied. Generally, the video tape cassette comprises a lower-half 7 and an upper half 11. A chamber 9 is formed at the front portion of said lower-half at one said thereof. The chamber 9 receives a cover-locking device of the present invention. The cover-locking device of the present invention comprises a cover-locking pin 1 provided at one surface thereof with a lock-releasing protrusion 3 and an engaging protrusion 4, and a pair of shafts 8 which laterally protrude outwardly from opposite sides of said cover-locking pin 1. The shafts 8 of cover-locking pin 1 are pivotably supported on support members 10 disposed in the chamber 9 of the lower-half 7, so that the cover-locking pin 1 is pivotably supported on the lower-half 7. The protrusions 3 and 4 are outwardly protruded through through-holes 5 and 6 formed in the side wall of the cassette as illustrated.

Figure 3:
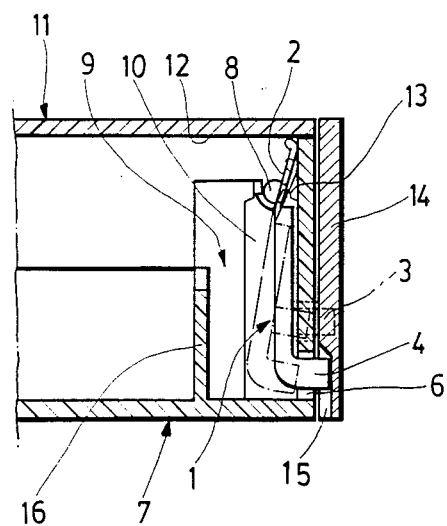
FIG. 3 is a partially cut-away side view of the cover-locking device of the present invention.
Figure 4A:
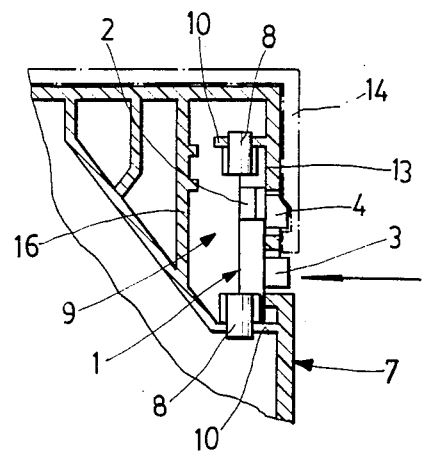
Figure 4B:
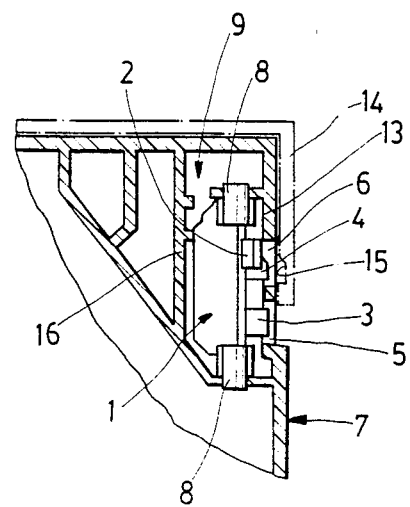

In accordance with the present invention, a spring member 2 is integrally formed on and protrudes upwardly and inclinedly from the upper portion of the cover-locking pin 1, so as to be urged upon the side inner surface of the chamber 9. In this regard, as illustrated in FIG. 1, the spring member has a protrusion on the free end thereof which has a cylindrical face which may contact a lower surface of the cassette cover as illustrated in FIG. 3.

In the drawings, the reference numeral "14." designates a cassette cover, "15" an engaging groove formed at a inner surface of said cover 14, and "16" an inner wall of the chamber 9.

The assembly of the cover-locking device of the present invention in the tape cassette is simply accomplished by pivotably supporting right and left shafts 8 of the cover-locking pin 1 on the support members 10 in the chamber 9 of the lower-half 7 and then assembling the upper-half 11 on the lower-half 7. In the assembled condition, the spring member 2 is in contact with the inner surface 13 of the chamber 9 and urged thereupon, thereby effecting a spring function. At this time, the lock-releasing protrusion 3 and the engaging protrusion 4 are outwordly protruded through the through-holes 5 and 6, respectively. In particular, the engaging protrusion 4 is engaged in the engaging groove 15 of the cover 14. Thus, the cover 14 cannot be optionally opened in such a normal condition.

When the tape cassette is loaded on a deck, the lock-releasing protrusion 3 which has been outwardly protruded through the through-hole 5 formed at the lower-half 7 comes in contact with a lock-releasing spring (not shown) which protrudes from one side of a cassette holder of the deck. As a result, the lock-releasing protrusion 3 is retracted through the through-hole 5, thereby causing the cover-locking pin 1 to pivot about the support members 10 such that the spring member 2 is forcedly urged upon the inner surface 13 of the chamber 9. Simultaneously, the cover 14 is automatically opened as the engaging protrusion 4 is disengaged from the engaging groove 15 of the cover 14. By forcedly urging the spring member 2 upon the inner surface 13 of the chamber 9, a return pressure is generated. When the tape cassette is unloaded from the deck, the return pressure causes the cover-locking pin 1 to pivot about the support members 10 to its orignal position wherein the engaging protrusion 4 is engaged in the engaging groove 15 of the cover 14, thereby causing the cover 13 to be locked in its closed position.

As apparent from the above description, the cover-locking device according to the present invention utilizes no conventional locking spring. In accordance with the present invention, a spring member having a simple construction is integrally formed on the cover-locking pin. In accordance with this simple construction, the automatic assembly of the tape cassette can be easily accomplished. In addition, the manufacturing cost can be reduced, in view of the fact that no coil spring is used.

What is claimed is:

1. A cover-locking device for a video tape cassette including a lower-half, an upper-half, and a chamber formed at a front portion of said lower-half at one side thereof, said cover-locking device comprising a cover-locking pin having lock-releasing and engaging protrusions extending from one side thereof, adapted to outwardly protrude through respective through-holes formed in said one side of said lower-half, and a pair of shafts laterally protruding from opposite upper sides of said cover-locking pin for pivotally supporting said cover-locking pin on support members disposed in said chamber, said cover-locking device further comprising a spring member integrally formed on an upper surface of said cover-locking pin, said spring member extending upwardly and outwardly from the upper surface at an acute angle with respect to a direction normal to said upper surface in the direction at which said releasing and engaging protrusions protrude so as to be urged upon a side inner surface of said chamber when said cover-locking pin is supported on said support members.

2. A cover-locking device according to claim 1, wherein said spring member is positioned between said pair of shafts.

3. A cover-locking device according to claim 2, wherein said spring member is formed on an edge portion of said upper surface.

4. A cover-locking device according to claim 1, wherein said spring member is substantially rectangular and includes a protrusion on a free end thereof, which protrusion extends toward a plane defined by said one side of said locking-pin from which said locking-release and engaging protrusions extend.

5. A cover-locking device according to claim 4, wherein said spring member prortrusion has a substantial cylindrical face surface.

6. A cover-locking device according to claim 4, wherein said spring member protrusion is adapted to engage a lower surface of a cassette cover, when said cover-locking pin is supported on said support members.

* * * * *